(12) United States Patent
Grohs et al.

(10) Patent No.: US 9,803,925 B2
(45) Date of Patent: Oct. 31, 2017

(54) THERMAL SHIELDING SYSTEM

(71) Applicant: PLANSEE SE, Reutte (AT)

(72) Inventors: Christian Grohs, Breitenwang (AT); Karl Huber, Reutte (AT); Arno Plankensteiner, Absam (AT); Karl Raggl, Hoefen (AT); Bernhard Valentini, Reutte (AT)

(73) Assignee: Plansee SE, Reutte (AT)

( * ) Notice: Subject to any disclaimer, the term of this patent is extended or adjusted under 35 U.S.C. 154(b) by 300 days.

(21) Appl. No.: 14/654,611

(22) PCT Filed: Dec. 19, 2013

(86) PCT No.: PCT/AT2013/000203
§ 371 (c)(1),
(2) Date: Jun. 22, 2015

(87) PCT Pub. No.: WO2014/094009
PCT Pub. Date: Jun. 26, 2014

(65) Prior Publication Data
US 2015/0345868 A1  Dec. 3, 2015

(30) Foreign Application Priority Data
Dec. 20, 2012  (AT) ................ GM477/2012

(51) Int. Cl.
*C30B 35/00* (2006.01)
*F27D 1/00* (2006.01)
(Continued)

(52) U.S. Cl.
CPC ............ *F27D 1/0033* (2013.01); *C04B 35/48* (2013.01); *C21D 9/00* (2013.01); *F27B 1/14* (2013.01);
(Continued)

(58) Field of Classification Search
CPC ........ C30B 11/00; C30B 11/003; C30B 13/00; C30B 13/16; C30B 15/00; C30B 15/14;
(Continued)

(56) References Cited

U.S. PATENT DOCUMENTS 1,769,708 A * 7/1930 Morgan ................ C04B 35/48
29/521
3,211,443 A   10/1965 Starner et al.
(Continued)

FOREIGN PATENT DOCUMENTS

CN  1563214 A  1/2005
CN  1584297 A  2/2005
(Continued)

OTHER PUBLICATIONS

Plansee Group, "Plansee Seminar 2013, International Conference on Refractory Metals and Hard Materials", Jun. 3-7, 2013, pp. 1-44.
(Continued)

*Primary Examiner* — Kenneth A Bratland, Jr.
(74) *Attorney, Agent, or Firm* — Laurence A. Greenberg; Werner H. Stemer; Ralph E. Locher

(57) ABSTRACT

A thermal shielding system for thermally shielding a batch space of high-temperature furnaces includes at least one shielding element. The shielding element has an encasing wall formed of refractory metal sheet(s) and a ceramic material accommodated in the wall. The ceramic material is present in a particulate and/or fibrous structure and it is based on zirconium oxide ($ZrO_2$)

15 Claims, 2 Drawing Sheets

(51) Int. Cl.
  *C21D 9/00*   (2006.01)
  *C04B 35/48*  (2006.01)
  *F27B 1/14*   (2006.01)
  *F27B 3/12*   (2006.01)
  *F27B 5/08*   (2006.01)
  *F27B 14/10*  (2006.01)
  *F27D 1/02*   (2006.01)

(52) U.S. Cl.
  CPC .................. *F27B 3/12* (2013.01); *F27B 5/08* (2013.01); *F27B 14/10* (2013.01); *F27D 1/0006* (2013.01); *F27D 1/02* (2013.01)

(58) Field of Classification Search
  CPC ......... C30B 33/00; C30B 33/02; C30B 35/00; C30B 35/007; F27D 1/0006; F27D 1/0033; F27D 1/02; C04B 35/48; C21D 9/00; F27B 1/14; F27B 3/12; F27B 5/08; F27B 14/10
  USPC ......... 117/200, 204, 206, 208, 217–218, 222
  See application file for complete search history.

(56) References Cited

U.S. PATENT DOCUMENTS

| | | | |
|---|---|---|---|
| 3,258,349 A * | 6/1966 | Scott | .................. C04B 38/06 264/44 |
| 3,456,935 A | 7/1969 | Bornor | |
| 4,863,146 A | 9/1989 | Bricmont | |
| 5,744,093 A | 4/1998 | Davis | |
| 2011/0135947 A1 | 6/2011 | Berndt et al. | |
| 2012/0266809 A1 | 10/2012 | Lee et al. | |

FOREIGN PATENT DOCUMENTS

| | | |
|---|---|---|
| CN | 102086503 A | 6/2011 |
| DE | 1433829 A1 | 10/1968 |
| EP | 1484427 A2 | 12/2004 |
| GB | 1083586 | 9/1967 |
| JP | 2002333279 A | 11/2002 |
| RU | 2202009 C2 | 4/2003 |
| RU | 2338140 C1 | 11/2008 |
| RU | 2402622 C2 | 10/2010 |
| RU | 100770 U1 | 12/2010 |
| RU | 2419689 C2 | 5/2011 |
| WO | 2011083898 A1 | 7/2011 |

OTHER PUBLICATIONS

Valentini, B., et al., "New Design Solutions for Thermal Insulation Systems for High-Temperature Furnaces", 18th Plansee Seminar, pp. 1-10, Plansee SE, Reutte, Austria.

Valentini, B, et al., "New Design Solutions for Thermal Insulation Systems for High-Temperature Furnaces", 18th Plansee Seminar, pp. 1, Plansee SE, Reutte, Austria.

* cited by examiner

THERMAL SHIELDING SYSTEM

BACKGROUND OF THE INVENTION

Field of the Invention

The present invention relates to a thermal shielding system for thermally shielding a batch space of high-temperature furnaces, said thermal shielding system comprising at least one shielding element.

Thermal shielding systems are used in high-temperature furnaces in order to keep the heat generated by the respective heating system and required for the respective process in the batch space as far as possible in the batch space.

In one concept which has been used to date in high-temperature furnaces, the thermal shielding system is formed by a plurality of (e.g. 5-15) radiant plates made of tungsten or molybdenum which are arranged substantially parallel to one another and are kept spaced apart by way of spacers. Furthermore, it is known to thermally shield the batch space in high-temperature furnaces using appropriately stacked ceramic bricks (for example made of zirconium oxide).

WO 2011/083898 A1 discloses a thermal shielding system for high-temperature furnaces for growing sapphire single crystals, in which a plurality of insulation blocks arranged spaced apart are provided. The insulation blocks themselves are formed in particular from graphite. Furthermore, an insulation layer, for example made of steel, can be provided between at least two insulation blocks. Further thermal shielding systems for high-temperature furnaces are known from documents RU 100770 U1 and from JP 2002-333279 A.

The ever increasing demands in terms of productivity, the product quality of the parts treated thermally (or produced) in high-temperature furnaces and the energy efficiency of high-temperature furnaces necessitate further optimization of thermal shielding systems. In particular, with respect to the product quality, there is the demand in the case of many products that only small temperature gradients arise in the batch space, it being possible for this to be achieved in particular by increasing the shielding action of the thermal shielding system. An increase in the shielding action furthermore improves the energy efficiency of high-temperature furnaces.

In the case of the conventional radiant plate systems, the shielding action can be improved by increasing the number of radiant plates. The number of surfaces over which the heat flow takes place is thereby increased, and therefore a comparatively greater drop in temperature can be achieved by way of the plurality of radiant plates. This is typically accompanied by a reduction in the plate thickness. By way of example, use is made of plate thicknesses in the range of 0.25-2.0 mm, which have a clearance only in the range of 4-8 mm between one another. This optimization of radiant plate shielding is limited, however, since this results in a filigree structure of many parts and considerable ageing phenomena arise. Replacement of the radiant plates is associated with effort and costs.

In the case of the ceramic bricks which are conventionally used, the low thermal conductivity of the ceramic material (in particular zirconium oxide or aluminum oxide) is utilized. Here, too, there is a need for optimization, however.

BRIEF SUMMARY OF THE INVENTION

Accordingly, it is an object of the present invention to further improve thermal shielding systems for high-temperature furnaces in respect of their shielding action and also energy efficiency, with the intention being to ensure a long service life thereof at the same time. The thermal shielding system in this respect is to be designed, in particular, for target temperatures of ≥1500° C., in particular of ≥1700° C.

The object is achieved by a thermal shielding system as claimed. Advantageous developments of the invention are indicated in the dependent claims.

According to the present invention, provision is made of a thermal shielding system for thermally shielding a batch space of high-temperature furnaces, said thermal shielding system comprising at least one shielding element. The shielding element has a surround (enclosure) made up of refractory metal sheet(s) and a ceramic material, present in a particulate and/or fibrous structure, based on zirconium oxide ($ZrO_2$), which is accommodated in the surround. It is preferable that the ceramic material is present as a whole either in a particulate structure or alternatively in a fibrous structure, i.e. there is preferably no mixture of particles and fibers.

Since, according to the present invention, use is made of a ceramic material present in a particulate and/or fibrous structure, the thermal conductivity is further reduced, this being advantageous in terms of the shielding action, compared to the bulk material. Furthermore, compared to the bulk material, the heat capacity is reduced, this being advantageous in terms of the energy efficiency during heating phases and cooling phases and in terms of productivity. Owing to the particulate and/or fibrous structure, heat conduction between the individual particles or fibers is made possible only via the relatively small contact points between the individual particles or fibers. Furthermore, radiation effects arise between the individual particles and fibers. In particular, in the case of a material based on zirconium oxide ($ZrO_2$), it is possible to achieve very low thermal conductivities in the range of a few tenths W/(mK) (watts per meter kelvin), for example in the range of 1/10 W/(mK) up to 1 W/(mK) (these figures apply to the entire temperature range in question). Since the ceramic material present in a particulate and/or fibrous structure is accommodated in the surround made up of refractory metal sheet(s), a modular design is obtained, this being advantageous in terms of handling, in terms of repair work and also in terms of replacing the ceramic material and/or the entire shielding element. In particular, if ageing phenomena arise on the ceramic material (e.g. decomposition increasing with time), it can be removed from the surround and replaced, whereas the surround can be used repeatedly. The refractory metal sheet(s) of the surround can have a considerably thicker and more stable form in the present invention as compared with conventionally used radiant plates, this being advantageous in terms of the stability and service life of the shielding element. The thickness of the refractory metal sheet(s) of the surround is chosen in particular depending on the size of the shielding element, it being preferable that the thickness increases with an increasing size. In addition, radiation effects also arise on the refractory metal sheet(s) of the surround, this being advantageous for the thermal shielding action. Accordingly, the combination of the ceramic material present in a particulate and/or fibrous structure with the surround made up of refractory metal sheet(s) achieves a very good shielding action, a high energy efficiency, a long service life, simple maintenance, simple replacement of the ceramic material and simple replacement of the entire shielding element. Particularly in applications with high target temperatures, in particular at target temperatures of ≥1500° C., preferably at target temperatures of ≥1700° C., up to target temperatures in the region of 2500° C., the thermal shielding system according to the invention is superior to the conventional shielding systems consisting of radiant plates or ceramic bricks as outlined above.

In the present context, the term "high-temperature furnaces" denotes furnaces and reactors which are designed for a target temperature of ≥1500° C., in particular of ≥1700° C., up to target temperatures in the region of 2500° C. High-temperature furnaces of this type are used, for example, for sintering refractory metals, in particular molybdenum-based or tungsten-based materials, for growing sapphire single crystals for LED production, etc. Here, the term "target temperature" denotes the maximum achievable temperature inside the batch space when running through a temperature profile (e.g. heating phase, if appropriate with a plurality of ramps; holding phase at the target temperature; cooling phase). The thermal shielding system according to the invention is particularly suitable in high-temperature furnaces in which, on account of the thermal processes proceeding inside the batch space, it is necessary to dispense with the use of carbon-containing compounds, in particular with graphite. Furthermore, the thermal shielding system according to the invention is particularly well suited to high-temperature furnaces which are heated not inductively but rather, for example, using electrical (resistance) heating elements.

The term "surround" denotes a preferably closed or alternatively possibly also partially open container or a can which holds and delimits the ceramic material in the outer basic form in which the thermal shielding element is to be present. Here, the basic form has such a high thickness, determined by the refractory metal sheets arranged spaced apart, that a cavity is formed therebetween for accommodating the ceramic material. For thermal shielding on the top side and/or bottom side (with respect to the position of use of the high-temperature furnace), the surround can in particular have in each case a disk-like basic form (as a top part or as a bottom part), within which a cavity for accommodating the ceramic material is formed. For lateral thermal shielding (with respect to the position of use of the high-temperature furnace), the surround can have, for example, a hollow-cylindrical basic form, a basic form of a hollow cylinder segment or more generally a basic form running completely or only partially around the respective batch space with a predetermined height of extent. In this respect, lateral thermal shielding of the batch space can also comprise a plurality of shielding elements in the form of individual segments, which in use are then arranged running around the batch space. The surround can have a gas-tight form, thereby avoiding the ingress of moisture and/or avoiding the formation of deposits inside the surround. This is not necessary, however. Instead, it is preferable that the surround also makes gas circulation possible. In particular, the surround can also have one or more openings, which are arranged at those positions at which the ceramic material cannot escape in the respective position of use of the shielding element. Which variant is preferred is to be weighed up in particular on the basis of the processes proceeding inside the high-temperature furnace.

In the present context, the term "refractory metal" denotes a metallic material (present in elemental form or as an alloy, if appropriate also with non-metallic additives, for example oxides, carbides, etc.) which has a melting temperature of ≥2000° C. The ceramic material can be present in particulate or granular form, in particular in the form of a bed of individual particles or grains.

The individual particles in turn can additionally also have a porous form. Alternatively, the ceramic material can also be present in fibrous form, in particular as a fiber mat. A "material based on zirconium oxide ($ZrO_2$)" is a material consisting of zirconium oxide (in precise terms zirconium dioxide, i.e. $ZrO_2$) to an extent of at least 50% by weight, preferably to an extent of at least 80% by weight, further preferably to an extent of at least 90% by weight, it also being possible for the zirconium oxide ($ZrO_2$) to comprise yet further compound constituents (for example Si), for the zirconium to be present partially in a different oxidation stage (to +IV), for the zirconium to be present in an oxidation stage differing slightly from exactly +IV and/or for the ceramic material to comprise further additives. In particular, additives for high-temperature stabilization, for example yttrium oxide, calcium oxide, potassium, etc., can be added to the zirconium oxide ($ZrO_2$) (in proportions of up to 20% by weight, in particular up to 10% by weight). The remaining proportions of the ceramic material not consisting of zirconium oxide ($ZrO_2$) form a solid solution in particular with the zirconium oxide. In addition or as an alternative, however, they can also be present as (a) separate phase(s) and/or as separate particles or fibers. Zirconium oxide is particularly preferable with respect to its low thermal conductivity and its high-temperature stability (which can be further improved inter alia by the aforementioned additives). In principle, yet further components can also be accommodated inside the surround in addition to the ceramic material. In particular, supporting elements, metallic sheets, etc. can be provided inside the surround. It is preferable that exclusively the ceramic material present in a particulate and/or fibrous structure and based on zirconium oxide is accommodated inside the surround.

According to one development, the ceramic material is present as a bed of individual particles. A bed is preferable since the material can be reused and if appropriate material can be refilled into the surround. Furthermore, a bed makes it possible that the ceramic material can be easily replaced, since it merely has to be emptied from the surround (which if appropriate is only to be opened at a suitable position) and the surround can then be filled with a new, ceramic material in the form of a bed. With respect to achieving a low packing density with long-term stability, it is particularly preferable if the bed of individual particles has a monomodal grain distribution. A monomodal grain distribution is understood to mean that all the individual particles have a substantially identical grain size (within an acceptable tolerance range). The mean grain size k of the bed is in particular in a range of $0.1 \text{ mm} \leq k \leq 4 \text{ mm}$. The bed preferably has a spherical or substantially spherical grain shape.

According to one development, the ceramic material consists to an extent of ≥80% by weight of zirconium oxide ($ZrO_2$). In particular, the ceramic material consists to an extent of ≥90% by weight of zirconium oxide ($ZrO_2$).

As is explained above, such a high proportion is advantageous with respect to the low thermal conductivity and also the high-temperature stability.

In principle, metallic materials based on Mo (molybdenum) or W (tungsten) (i.e. consisting of Mo to an extent of at least 50% by weight or consisting of W to an extent of at least 50% by weight) are particularly preferable for the refractory metal sheet(s). If the shielding element is exposed to particularly high temperatures, as is the case for example if it is arranged directly adjacent to the batch space of a high-temperature furnace, a material based on W (i.e. consisting of W to an extent of at least 50% by weight) is particularly preferable on account of the relatively high melting temperature at least on the side facing toward the batch space. According to one development, the refractory metal sheet(s) is/are formed to an extent of ≥98% by weight from W, as a result of which this/these withstands/withstand particularly high operating temperatures. If, by contrast, one or more radiant plates are arranged between the batch space and the shielding element, a material based on Mo (i.e. consisting of Mo to an extent of at least 50% by weight) can also be used for the refractory metal sheet(s) of the shielding element. A material based on Mo has the advantage that it can be formed and processed more readily compared to a material based on W during the production of the surround.

According to one development, the refractory metal sheet(s) has/have a wall thickness $d_B$ in a range of 0.25 mm≤$d_B$≤2.5 mm, in particular in a range of 0.3 mm≤$d_B$≤1.2 mm. In these ranges, sufficient mechanical stability is achieved at still acceptable material costs. The wall thickness is preferably chosen depending on the size of the shielding element. It is preferable that the wall thickness increases with an increasing size of the shielding element.

According to one development, the shielding element has a thickness $d_E$ in the range of 8 mm≤$d_E$≤120 6mm, in particular in the range of 10 mm≤$d_E$≤60 mm. These ranges are particularly preferable with respect to the most effective shielding action possible, on the one hand, and with respect to a formation of the shielding element with the thinnest possible walls, on the other hand. The "thickness" is in this respect measured perpendicularly to the main area of extent of the shielding element in the respective point of observation, where the main area of extent can have a planar or a curved profile. The "thickness" generally runs substantially parallel to the shielding direction provided for the shielding element in question.

According to one development, in addition to the shielding element, the thermal shielding system comprises a plurality of spaced-apart radiant plates made of refractory metal. If appropriate, provision can also be made of only one radiant plate. The shielding action provided by radiant plates (or if appropriate by only one radiant plate) can thereby be combined advantageously with the shielding action provided by the shielding element according to the invention. In particular, this combination is advantageous since, on account of being filled with the ceramic material present in a particulate and/or fibrous structure, the shielding element according to the invention provides a relatively high shielding action, which is superior to that of radiant plates in particular at temperatures of ≥1500° C. and is significantly superior to that of radiant plates at temperatures of ≥1700° C. Accordingly, a considerable drop in temperature is achieved over the thickness of the shielding element especially when the latter adjoins regions at such high temperatures. If the thermal shielding system were to be formed exclusively by (one) shielding element(s) with a correspondingly thick form, it would, however, have a relatively high heat capacity, this being disadvantageous with respect to the energy efficiency and thermal inertia particularly in the thermally transient regime (e.g. heating and cooling phase). This is because a relatively high heat capacity of the shielding system can cause a delay when establishing a desired target temperature and/or an increased energy consumption in the case of increases in temperature which are to be established within a short time. Accordingly, specifically a sequence of shielding element and radiant plates is particularly advantageous. It is preferable that the radiant plates each have a main area of extent running substantially parallel to the main area of extent of at least one portion of the respective shielding element. In particular, the radiant plates are arranged adjacent to the shielding element along the shielding direction, it being possible in principle for radiant plates to be provided on the inner side (i.e. facing toward the batch space) and/or on the outer side (i.e. facing away from the batch space) in relation to the shielding element. The term "radiant plates" denotes a plurality of (at least two) plates arranged spaced apart during use. To achieve a thermal shielding action, use is made here in particular of the effect that the radiant plates radiate heat on each side toward both side faces and thus the temperature drops over a sequence of radiant plates. Accordingly, the main areas of extent of the individual radiant plates are oriented substantially parallel to one another and also substantially parallel to the main area of extent of the shielding element, where minor deviations from a precisely parallel orientation are acceptable for achieving a sufficient thermal shielding action.

In principle, more than only one alternation between radiant plate(s) and shielding element is possible along the shielding direction. By way of example, firstly one or more radiant plate(s), then a shielding element and then in turn at least one or more radiant plate(s) can be provided along the shielding direction.

According to one development, the radiant plate(s) is/are made of molybdenum (pure molybdenum comprising impurities and/or additives up to an extent of at most 2% by weight), of a molybdenum-based alloy (i.e. an alloy with an Mo proportion of ≥50% by weight), of tungsten (pure tungsten comprising impurities and/or additives up to an extent of at most 2% by weight) or of a tungsten-based alloy (i.e. an alloy with a W proportion of ≥50% by weight). These materials have proven to be particularly suitable in use, with particular preference being given to radiant plates made of molybdenum or alternatively made of tungsten. The selection between tungsten (or a tungsten-based alloy) on the one hand and molybdenum (or a molybdenum-based alloy) on the other hand is influenced in particular by the temperatures to which the respective radiant plate is exposed during use. Accordingly, it is preferable that radiant plates exposed to high temperatures during use, for example because they adjoin the batch space directly or only via relatively low thermal shielding during use, are formed from tungsten (or alternatively from a tungsten-based alloy). Furthermore, with respect to costs and with respect to the processability of the radiant plates, it is preferable that those radiant plates which are exposed to only relatively lower temperatures, for example because they are thermally shielded from the batch space by more extensive thermal shielding during use, are formed from molybdenum (or alternatively from a molybdenum-based alloy).

The present invention further relates to a high-temperature furnace, comprising a batch space for the thermal treatment of parts and also a thermal shielding system according to the invention, which at least partially surrounds the batch space and which, if appropriate, can also be formed according to one or more of the above-mentioned developments and/or variants.

According to one development, the thermal shielding system comprises a plurality of radiant plates made of refractory metal, which are spaced apart in a shielding direction (running outward from the center of the batch space) and are arranged adjacent to the shielding element in the shielding direction. In principle, it is possible for radiant plates to be provided on the inner side (i.e. facing toward the batch space) and/or on the outer side (i.e. facing away from the batch space) in relation to the shielding element. It is preferable that the radiant plates are arranged on that side of the shielding element which faces away from the batch space. As will be explained in detail hereinbelow, a shielding action significantly superior to that of conventional radiant plates can thereby be achieved especially at high temperatures inside the batch space, for example at temperatures of ≥1500° C., in particular at temperatures of ≥1700° C. The radiant plates have in particular a wall thickness in the range of 0.25-2.0 mm. In particular, the clearance between two mutually adjacent radiant plates lies in a range of 4-8 mm. It is preferable that the clearance between the refractory metal sheet of the shielding element and the adjoining radiant plate also lies in this range.

According to one development, the number a of radiant plates arranged adjacent to the shielding element in the shielding direction lies in the range of 1≤a≤7, in particular in the range of 2≤a≤5. Within this range, it is possible to achieve a sufficient shielding action without the shielding system having to be formed with an excessive thickness. According to one development, the high-temperature furnace has at least one electrical heating element, in particular an electrical resistance heating element, for heating the batch space. The electrical heating element is arranged in particular inside the thermal shielding system (i.e. on that side of the thermal shielding system which faces toward the batch space). The thermal shielding system according to the invention is suitable particularly for electrically heatable high-temperature furnaces.

According to one development, at least one shielding element is in the form of lateral shielding which at least partially surrounds the batch space. In particular, the shielding element in question can have a hollow-cylindrical basic form, a basic form of a hollow cylinder segment or more generally a basic form running completely or partially around the batch space with a predetermined height. In this way, space-saving and effective shielding can be provided in a lateral direction. The terms "lateral" and "height" above relate in this respect to a high-temperature furnace with a main axis oriented substantially vertically in use. In this respect, it is to be taken into consideration that, in addition to high-temperature furnaces arranged "upright" in use, i.e. with a substantially vertically oriented main axis, there are also high-temperature furnaces arranged "lying" in use, i.e. with a substantially horizontally oriented main axis. In the latter case of the lying arrangement, too, the shielding can be formed largely correspondingly in relation to the respective main axis. In the latter case, in particular, "lateral" refers to a position offset radially to the main axis and, instead of the height direction, a direction running parallel or substantially parallel to the main axis is applicable.

According to one development, at least one shielding element is in the form of a component which is removable from the high-temperature furnace in modular form. Owing to a modular design of this type, the shielding element can easily be removed from the high-temperature furnace, as a result of which it is easy to replace the entire shielding element, to replace the ceramic material inside the shielding element and/or to fill the ceramic material inside the shielding element.

Further advantages and benefits of the invention will become apparent on the basis of the following description of exemplary embodiments with reference to the accompanying figures.

DESCRIPTION OF THE INVENTION

Figure 1:
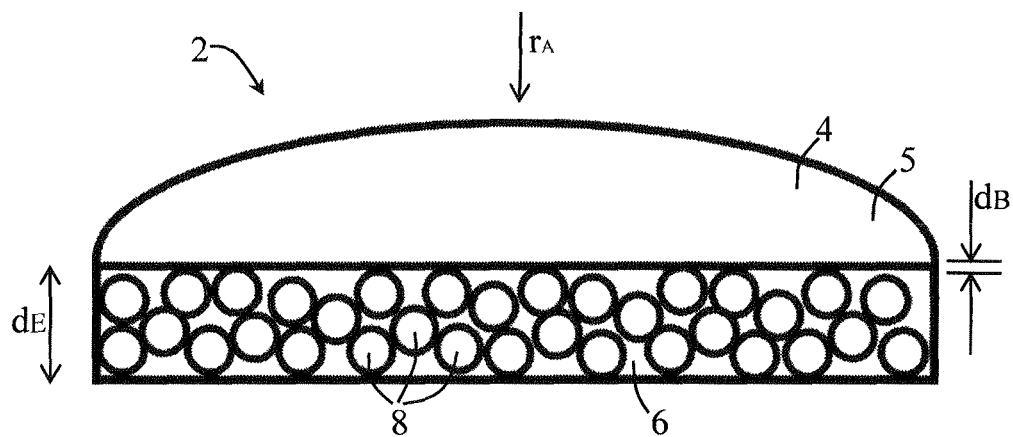
FIG. 1: shows a schematic cross-sectional view of a shielding element according to the invention according to a first embodiment.

FIG. 1 shows a shielding element 2 according to a first embodiment of the present invention. The shielding element 2 has a disk-like basic form. The basic form is formed by a closed surround 4 made up of tungsten sheet(s) 5 (the surround 4 in the present case not having a gas-tight form). A disk-like cavity 6 is formed inside the surround 4 and is filled with a ceramic bed 8 of high-temperature-stabilized zirconium oxide ($ZrO_2$), the size ratio of the particles relative to the surround not being reproduced correctly. The ceramic bed 8 has a monomodal grain size distribution. The mean grain diameter of the bed is 2 mm. The tungsten sheet has a wall thickness $d_B$ of 1 mm. The shielding element 2 has a thickness $d_E$ of 50 mm. The shielding direction $r_A$ for which the shielding element 2 shown is designed runs parallel to the direction of measurement shown for the thickness $d_E$.

The disk-like basic form is designed in particular for the realization of bottom-side and/or top-side shielding. In this respect, the shielding element 2 can be used alone or alternatively in combination with further shielding components, for example with radiant plates. The disk-like basic form can also have yet further structures and/or openings for adaptation to components of a high-temperature furnace, for example to heating elements, to connection contacts for the heating elements, to further components of the shielding system, etc. By way of example, the shielding element 2 can have a circumferential step or groove for receiving at least one further, lateral shielding element.

In the explanation of the further embodiments which follows, details are provided predominantly in relation to the differences compared to the first embodiment. Where identical components or components corresponding to one another are identified, the same reference signs are used to some extent.

Figure 2:
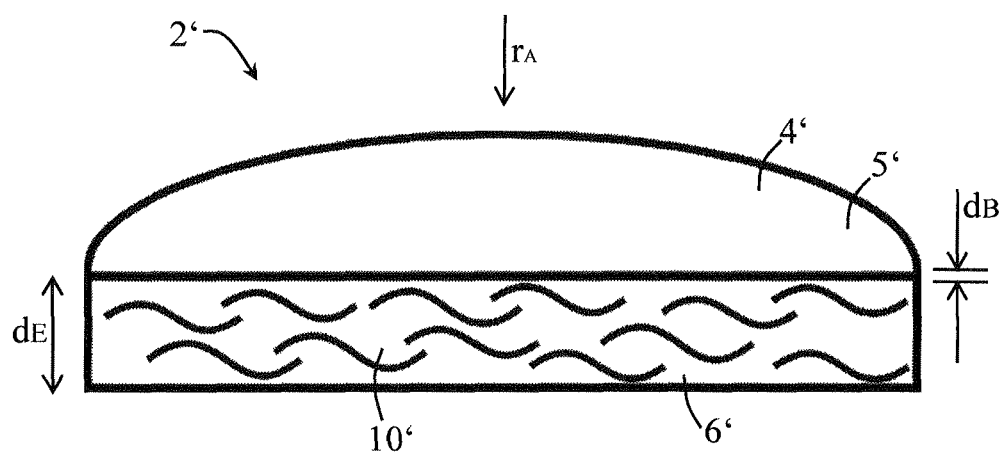
FIG. 2: shows a schematic cross-sectional view of a shielding element according to the invention according to a second embodiment.

In the embodiment shown in FIG. 2, the shielding element 2' in turn has a closed surround 4' made up of tungsten sheet(s) 5' (the surround 4' in the present case not having a gas-tight form). In contrast to the first embodiment, the material made of high-temperature-stabilized zirconium oxide ($ZrO_2$) which is accommodated in the cavity 6' of the surround 4' is present in a fibrous structure. In particular, the material is accommodated in the form of a fiber mat 10' in the surround 4'.

Figure 3:
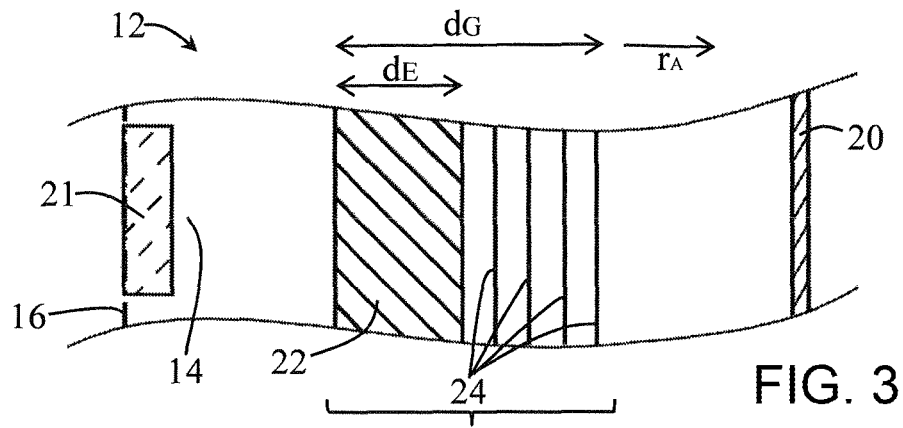
FIG. 3: shows a schematic section from a high-temperature furnace for illustrating a third embodiment of a shielding system according to the invention.

Hereinbelow, three embodiments of a thermal shielding system according to the invention, which in this case forms lateral shielding, will be explained with reference to FIGS. 3 to 5. FIG. 3 shows a section from a high-temperature furnace 12. The section runs along the radial direction and also along the axial direction of a main axis or axis of symmetry 16, the illustration corresponding to a position of use of the high-temperature furnace 12 with an axis of symmetry 16 oriented vertically or in the height direction.

The section shown extends in the radial direction from the axis of symmetry 16 arranged centrally inside a batch space 14 via a lateral, thermal shielding system 18 as far as a lateral, outer housing 20. The housing 20 is formed from steel, for example.

A component 21 to be thermally treated is shown schematically in the batch space 14. The thermal shielding system 18 has a lateral shielding element 22. This has a design corresponding to that of the shielding element 2 according to the first embodiment (cf. FIG. 1). In particular, the lateral shielding element 22 has a surround (not shown in detail) made up of tungsten sheet(s), in which a bed (not shown in detail) of high-temperature-stabilized zirconium oxide ($ZrO_2$) is accommodated.

The thermal shielding system 18 furthermore has a plurality of (here: four) radiant plates 24, which are spaced apart in the shielding direction and are arranged adjacent to the lateral shielding element 22 in the shielding direction $r_A$.

The radiant plates 24 are arranged on that side of the lateral shielding element 22 which faces away from the batch space 14. The shielding element 22 is formed running around the batch space 14 and extends along the height direction over a predetermined height. The radiant plates 24 are formed correspondingly with a diameter of increasing size. Appropriate additional structures or through-openings can be provided both in the shielding element 22 and in the radiant plates 24, for example for adaptation to further components of the high-temperature furnace 12 (e.g. to heating elements, to connection contacts for the heating elements, to a charge opening, etc.). Since the batch space 14 is already thermally shielded by the shielding element 22, it is sufficient for the radiant plates 24 to be formed from molybdenum. The individual radiant plates 24 each have a thickness of 0.25 mm. The overall thickness $d_G$ of the lateral, thermal shielding system 18 as measured along the shielding direction $r_A$ is approximately 43 mm, the thickness $d_E$ of the lateral shielding element 22 along the shielding direction $r_A$ being approximately 19 mm.

In the explanation of the fourth and fifth embodiments which follows, details are provided predominantly in relation to the differences compared to the third embodiment. The same reference signs are used again for identical components or components corresponding to one another (these reference signs being provided in each case with one or two primes).

Figure 4:
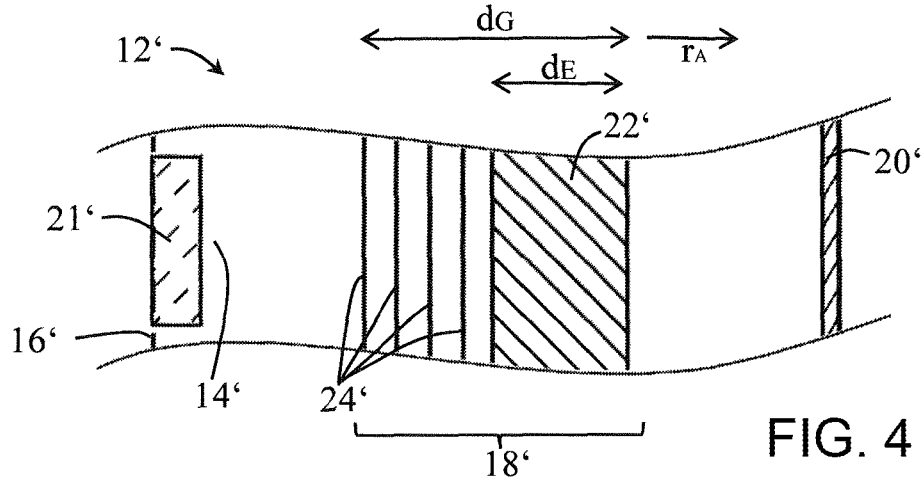
FIG. 4: shows a schematic section from a high-temperature furnace for illustrating a fourth embodiment of a shielding system according to the invention.

In the fourth embodiment, shown in FIG. 4, the radiant plates 24' (here: four) are arranged on that side of the lateral shielding element 22' which faces toward the batch space 14'. Of the radiant plates 24', at least those which are arranged directly adjacent to the batch space 14' or which are at only a small distance from the batch space 14' (for example the first three) are formed from tungsten, on account of the high temperatures which arise in this region. The radiant plates 24' which follow further to the outside in the shielding direction $r_A$ (for example the remaining one) can also be formed in particular from molybdenum. The surround of the lateral shielding element 22' can also be formed from molybdenum (instead of tungsten), if appropriate.

Figure 5:
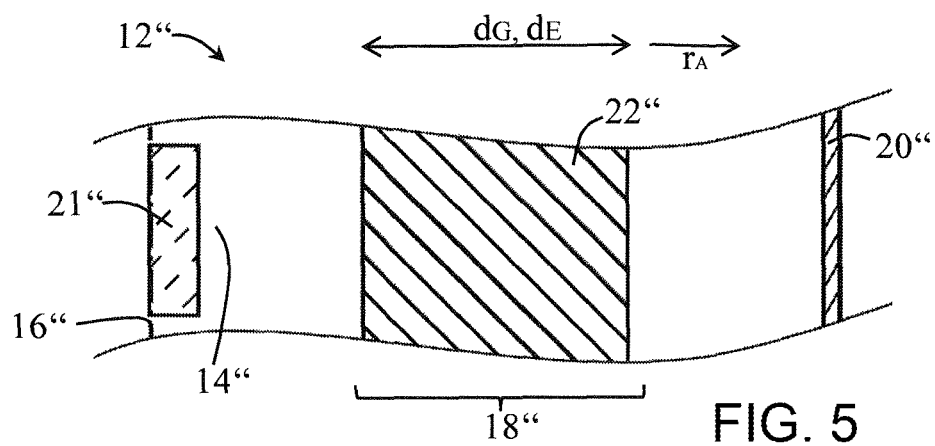
FIG. 5: shows a schematic section from a high-temperature furnace for illustrating a fifth embodiment of a shielding system according to the invention.

In the fifth embodiment, shown in FIG. 5, the lateral, thermal shielding system 18" is formed exclusively from a shielding element 22", i.e. no additional radiant plates are provided. The shielding element 22" has a correspondingly large thickness $d_E$ of 43 mm along the shielding direction $r_A$.

Concerning the various variants in which the shielding system according to the invention can be realized, the following points are to be taken into consideration with respect to the shielding action and to the behavior in use:

A ceramic material based on zirconium oxide ($ZrO_2$) present in a particulate and/or fibrous structure has a relatively low thermal conductivity (for example compared to refractory metals). Particularly at high temperatures, in particular at temperatures $\geq 1500°$ C., more preferably at temperatures $\geq 1700°$ C., the shielding action of the shielding element is significantly superior to that of a sequence of radiant plates having a comparable overall thickness. This means that, in use in a steady state at a correspondingly high temperature of the region adjoining the shielding element (e.g. of the batch space), a relatively large drop in temperature can be achieved over the thickness of the shielding element, and that the energy consumption for retaining the steady state is relatively low. The temperature gradient which arises inside the batch space can also thus be minimized, this being advantageous particularly for critical processes. The shielding element has, however, by comparison a higher heat capacity than a sequence of radiant plates extending over a comparable thickness. This leads to delays and possibly to an increased energy consumption during heating phases, if changes in temperature are to be established within short times.

In the light of the properties discussed above, the provision of one or more shielding elements without combining them with radiant plates affords advantages in particular for those high-temperature furnaces in which the temperature has to be kept steady or substantially steady at high values (e.g. $\geq 1500°$ C., in particular $\geq 1700°$ C.) for relatively long periods of time. This is the case, for example, in the production of sapphire single crystals.

In thermal processes with a relatively short duration which are carried out in succession, and/or when establishing a multi-stage temperature profile, work is performed relatively frequently in the thermally transient regime. This is also the case, for example, for sintering furnaces for refractory metals. For these applications, it is advantageous in terms of reducing the heat capacity of the thermal shielding system if the shielding element is combined with radiant plates. In this way, it is possible to lower the energy consumption which is required for increases in temperature to be carried out within a relatively short time. However, a combination of this type also affords advantages for the conditions of use explained above, in which the temperature has to be kept steady or substantially steady at high values (e.g. $\geq 1500°$ C., in particular $\geq 1700°$ C.) for relatively long periods of time, and is accordingly also well suited to such conditions of use.

It is to be taken into consideration that, at relatively low temperatures (e.g. 500° C.) and given an identical thickness of the shielding, the heat flux through radiation, which dominates in the case of radiant plates, lies below the heat flux through heat conduction, which dominates in the case of the shielding element. Accordingly, the shielding action of a sequence of radiant plates is superior to that of a shielding element of comparable thickness at relatively low temperatures (e.g. at temperatures in the region of 500° C.). For this reason, too, a combination of shielding element and radiant plates in particular is particularly advantageous. With respect to the relationships explained above, it is advantageous if the shielding element is arranged directly adjacent to the batch space and the sequence of radiant plates is arranged on that side of the shielding element which faces away from the batch space.

It is furthermore to be taken into consideration that, in the case of radiant plate shielding, the heat flux increases to a considerably greater extent with an increasing temperature than is the case for a shielding element. This results in the very good shielding action of the shielding element particularly at high temperatures (e.g. ≥1500° C., in particular ≥1700° C.). Accordingly, when a combination of shielding element and radiant plates is used, it is particularly preferable if the shielding element is arranged adjacent to the region of the high temperatures (e.g. ≥1500° C., in particular ≥1700° C.), in particular adjacent to the batch space.

It was also possible to verify the relationships presented by an analytical and numerical calculation.

The invention claimed is:

1. A thermal shielding system for thermally shielding a batch space of high-temperature furnaces, the shielding system comprising:
   at least one shielding element;
   said shielding element having a encasement made of refractory sheet metal and a ceramic material accommodated in said encasement, said ceramic material having a particulate structure and/or a fibrous structure and being based on zirconium oxide ($ZrO_2$).

2. The thermal shielding system according to claim 1, wherein said ceramic material is present as a bed of individual particles.

3. The thermal shielding system according to claim 2, wherein said bed of individual particles has a monomodal grain distribution.

4. The thermal shielding system according to claim 1, wherein said ceramic material consists of ≥80% by weight of zirconium oxide ($ZrO_2$).

5. The thermal shielding system according to claim 1, wherein said refractory sheet metal is formed of ≥98% by weight from tungsten.

6. The thermal shielding system according to claim 1, wherein said refractory sheet metal has a wall thickness $d_B$ where 0.25 mm ≤ $d_B$ ≤ 2.5 mm.

7. The thermal shielding system according to claim 1, wherein said shielding element has a thickness $d_E$ in a range of 8 mm ≤ $d_E$ ≤ 120 mm.

8. The thermal shielding system according to claim 1, which further comprises, in addition to said shielding element, a plurality of spaced-apart radiant plates made of refractory metal.

9. The thermal shielding system according to claim 8, wherein said radiant plates are formed of a material selected from the group consisting of molybdenum, a molybdenum-based alloy, tungsten, and a tungsten-based alloy.

10. A high-temperature furnace, comprising:
    a furnace body with a batch space for a thermal treatment of parts; and
    a thermal shielding system according to claim 1 at least partially surrounding said batch space.

11. The high-temperature furnace according to claim 10, wherein said thermal shielding system comprises a plurality of radiant plates made of refractory metal, which are spaced apart in a shielding direction and arranged adjacent said shielding element in the shielding direction.

12. The high-temperature furnace according to claim 11, wherein said radiant plates are arranged on a distal side of said shielding element remote from said batch space.

13. The high-temperature furnace according to claim 11, wherein a number of radiant plates arranged adjacent said shielding element in the shielding direction lies in a range from 1 to 7.

14. The high-temperature furnace according to claim 10, which comprises at least one electrical heating element for heating said batch space, said electrical heating element being disposed inside said thermal shielding system.

15. The high-temperature furnace according to claim 10, wherein at least one shielding element is in the form of a component which is removable from the high-temperature furnace in modular form.

* * * * *